April 13, 1965   M. A. MELVIN   3,177,827
OIL-FIRED PORTABLE ANGLE CREMATOR
Filed Feb. 11, 1963
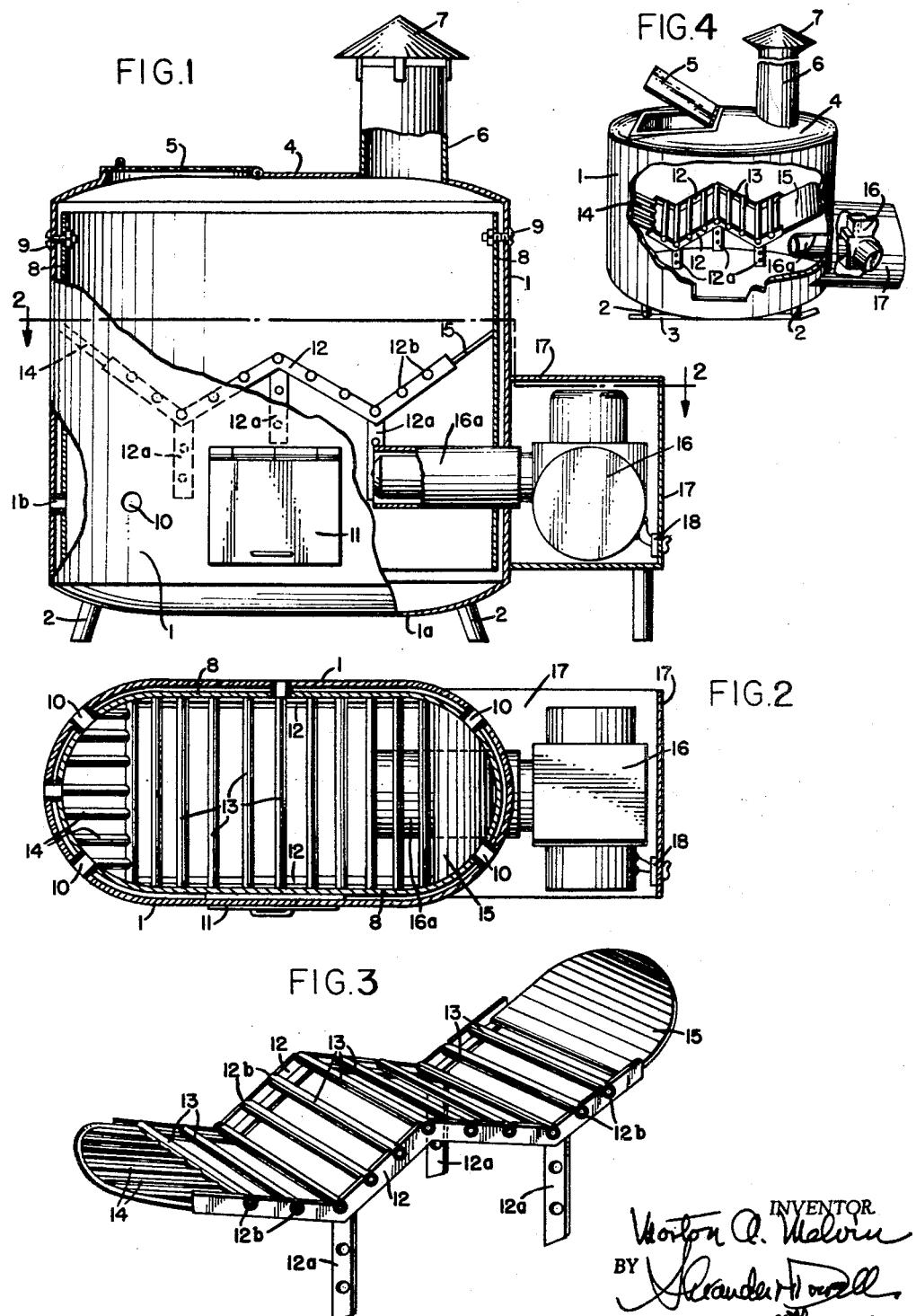
INVENTOR.
Morton A. Melvin
BY
Alexander Howell
attorneys

United States Patent Office 3,177,827
Patented Apr. 13, 1965

3,177,827
OIL-FIRED PORTABLE ANGLE CREMATOR
Morton A. Melvin, Airport Road, Harrington, Del.
Filed Feb. 11, 1963, Ser. No. 257,444
18 Claims. (Cl. 110—8)

This invention is a novel oil-fired portable angle crematory unit for the purpose of completely burning to ash dead fowl, such as chickens, turkeys, ducks and the like; also rubbish, the unit being designed for domestic use and operating under quick intense heat, and the unit being portable in that it may be mounted on skid runners or wheels of any type so as to be readily movable to any desirable place on a poultry farm or the like.

The principal object of the invention is to provide a unit of the above type in which all parts may be readily and easily replaceable and which may be used on farms or the like to cremate or burn from fifty to thirty carcasses per day. The method presently used on farms for disposing of fowl and other carcasses in times of pestilence or disaster is to bury same in bulk with chemicals, but it has been found that livestock and wildlife often have or obtain access to such burried carcasses thereby causing spreading of disease among likestock and wildlife, and this presents a very large problem in certain parts of the country, particularly where poultry or other farms are prevalent.

Another object of the invention is to provide a crematory unit of the above type having novel grates which are removably inserted in the casing to support the carcasses or rubbish, which grates are designed for and will withstand intense heat, the same being formed of spaced angle iron side frames having recesses in their upper edges in which metallic cross-tubes or rods are placed to support the carcasses, the shape of the grate being generally of a flattened W-shape so that air may pass between the pipes or bars and up through the angle of the grate evenly distributing the heat under the carcasses or rubbish disposed on the grate and permitting the necessary draft through the grate bars and carcasses, which would not be possible if the carcasses or other materials were piled upon a flat surface which would block the draft and would concentrate the heat only at the bottom of the grate, causing the grate material to warp under high temperatures and resulting in incomplete burning of the carcasses or rubbish.

Other objects of the invention are to provide a crematory unit of the above type which is designed primarily for outside domestic use; also a unit having a stainless steel inner lining to facilitate transfer of heat completely around the unit; also a unit which is preferably but not necessarily oil-fired, utilizing a gun-type atomizing burner which gives relatively intense heat. However, if desired, the unit could be designed for gas burning or for electric heating although I prefer to use an oil-fired burner of the gun-type as the same produces maximum heat concentration on the material to be cremated, whereas a gas or electric heating unit would produce in comparison relatively less heat.

A still further object of the invention is to provide an automatic timer for the unit which may be dial-set from the outside of the casing, the timer to be set for the desired time required depending upon the kind or bulk of carcasses or other material to be burned.

I will explain the invention with reference to the accompanying drawing, which illustrates one practical embodiment thereof to enable others familiar with the art to adopt and use the same, and will summarize in the claims the novel features of construction, and novel combinations of parts, for which protection is desired.

In said drawing:

FIG. 1 is a sectional view partly in elevation showing the arrangement of parts of the unit.

FIG. 2 is a horizontal section on the line 2—2, FIG. 1.

FIG. 3 is an enlarged perspective view of the grate, detached.

FIG. 4 is a reduced perspective view of the unit with a portion of the front face thereof broken away to show the arrangement of the interior parts thereof.

As shown in the drawing, my novel crematory unit preferably comprises an outer steel or other casing, which is preferably substantially elliptical in plan but may be of any other desired cross-sectional shape, the same having an outer wall 1 having a bottom 1a, FIG. 1, supported upon legs 2, as shown, which legs may, if desired, be connected with skids or runners 3, as shown in FIG. 4, or the casing may be supported upon wheeled axles (not shown) whereby the same may be readily portable from location to location on a farm or the like.

The top of casing 1 is closed by a top place 4 having a filling door 5 hingedly secured thereto for permitting the carcasses or rubbish when the door is raised to be dropped into the casing 1, the cover 5, however, when in lowered position, closing the filling opening, the door normally remaining closed during firing periods. Also, extending from the top 4 is a stack 6 of desired height which is provided at its upper end with a hood or cover 7 spaced from the upper end of stack 6 for preventing ingress of rain and snow into the interior of the casing. Also, if desired, a suitable grease filter, odor filter, and/or smoke filter (not shown) could be inserted in or used with the stack 6.

Within and spaced from the casing 1 is a stainless steel or other liner 8 which extends entirely around the interior of the sides of the casing, the same being maintained in spaced relation to the sides of the casing by means of bolts 9 or the like, FIG. 1. However, to permit air to enter the unit for the purpose of supporting combustion therein, a series of air inlets 10 are provided in the form of sleeves which pass through registering perforations in the outer wall 1 and spaced liner 8 as shown more particularly in FIG. 2. If desired, insulation (not shown) may be placed between the liner 8 and the outer wall 1 of the casing. In one side of the casing 1 adjacent the center thereof is a hinged cleanout door 11 whereby the cremated carcasses or rubbish may be withdrawn from the casing below the grate, a corresponding opening or door being also provided in the lining 8 in way of door 11.

As shown, the grate is preferably of flattened W-shape and is preferably formed of a pair of spaced angle irons 12 which extend substantially from end to end of the casing 1 except in way of the rounded end portions, each of the angle irons 12 being provided with depending bolting plates 12a which are perforated to receive bolts or the like which removably secure the angle irons 12 in substantially horizontal position to the respective sides of the casing, the bolts passing through the bolting plates 12a and into the liner 8. In the upper edge of each angle iron 12 is a series of spaced semi-circular recesses 12b adapted to receive and support the ends of grate tubes or rods 13 which form an undulating grate surface upon which the carcasses or rubbish is placed.

As shown in FIG. 1, the ends of the grate bars 12 are inclined upwardly at the respective ends of the casing 1, and extending from one end of the grate bars 12 is an auxiliary series of parallel bars 14 of varying length according to the rounded end of the casing 1, said rods 14 being in line with the adjacent series of bars 13 at that end of the grate 12 and forming a continuation of the grate, the bars 14, however, extending normal to the bars or rods 13.

At the opposite end of the grates 12–14 is a baffle 15 which is preferably or may be a solid plate in alignment with and forming a continuation of the adjacent series of cross-bars or rods 13 at that end of the grate, the outer edge of the baffle 15 being curved so as to substantially conform to the curvature of the adjacent end of the casing 1, as shown.

The tubes or bars 13–14 are preferably formed of iron pipe to withstand relatively intense heat, and the arrangement of pipe bars 13–14, due to the shaping of the angle frames to substantial W-shape, is necessary so that air may pass between the pipes 13–14 and up through the angles of the grate, thereby evenly distributing the heat under the carcasses or other matter, and providing for the necessary draft, this arrangement being obviously more desirable and efficient than when using grates which are flat. By making the grates substantially W-shape the carcasses are not piled on a flat surface which would block the draft and concentrate heat only on the bottom of the grate, causing the grate material to warp badly under high temperatures and resulting in incomplete burning of the carcasses or other refuse. By the above construction each of the bars 13–14 is easily replaceable.

In order to create the carcasses or other combustible rubbish or material, I preferably use an oil-fired burner 16, the nozzle 16a of which enters into the end of the casing 1 below the grate at the end below the baffle 15, which burner is preferably a gun-type atomizing burner producing intense heat. The outer exposed end of the burner 16 is housed under a hood 17 disposed at the adjacent end of the casing 1, as shown, and the burner 16 is preferably controlled by means of an automatic timer 18, also housed under the hood 17 and controllable from the outside of the hood. The timer may be set for the desired time required to cremate the mass or number of carcasses or bulk of other material which is to be cremated.

Instead of using a gun-type atomizing burner a different type of burner might be used, such as a gas or electric burner. However, I desire to use the gun-type atomizing burner as it gives a more intense heat. If desired, an electric heater could be used in place of the oil burner, and the pipes 13–14 themselves could be electrified, thereby making each pipe a resistance element.

By the above construction I provide a crematory unit particularly designed for cremating chickens or other animals which die on poultry or other farms, to prevent disease from spreading by such incineration instead of resorting to the usual practice heretofore followed of burying the carcasses with chemicals, which practice is injurious to wildlife or livestock.

I do not limit my invention to the exact form shown in the drawing, for obviously changes may be made therein within the scope of the claims.

I claim:

1. A crematory unit comprising a casing closed at its bottom and at its top; said top having a normally closed filling opening therein; a smokestack extending above said top; a liner within the casing extending around and spaced from the sides thereof; means for admitting air into the casing through the liner adjacent the lower end of the casing to support combustion; a normally closed clean-out door through the casing and liner; a burner in the casing adjacent the lower end thereof; and a grate horizontally disposed within the casing above the burner, said grate comprising spaced angle frames of relatively flattened W-shape in longitudinal cross section removably secured to the liner and having a series of semi-circular recesses in their upper edges; grate bars removably supported at their respective ends in said recesses in the spaced angle frames, thereby forming an undulating grate surface adapted to support the material to be cremated while permitting free passage of combustion gases therethrough.

2. In combination with a unit as set forth in claim 1, an inclined baffle plate extending from the end of the grate over the burner to the adjacent end of the casing, said plate being disposed in alignment with and forming a continuation of the adjacent series of grate bars.

3. In combination with a unit as set forth in claim 1, an auxiliary series of parallel grate bars extending from the end of the grate remote from the burner and disposed normal to the adjacent series of grate bars and being disposed in alignment with said adjacent series of grate bars on the frames and forming a continuation of said adjacent series and extending to the adjacent end of the casing.

4. In a unit as set forth in claim 1, said burner comprising an oil-fired gun-type atomizing burner.

5. In a unit as set forth in claim 1, skid runners supporting said casing whereby the same is readily portable to different locations.

6. A crematory unit comprising a casing closed at its bottom and at its top; said top having a normally closed filling opening therein; a smokestack extending above said top; a liner within the casing extending around and spaced from the sides thereof; means for admitting air into the casing through the liner adjacent the lower end of the casing to support combustion; a normally closed clean-out door through the casing and liner; a burner having a nozzle entering the casing adjacent the lower end thereof; a hood over the exposed outer end of the burner; and a grate horizontally disposed within the casing above the burner, said grate comprising spaced angle frames of relatively flattened W-shape in longitudinal cross section removably secured to opposite sides of the liner and having a series of semi-circular recesses in their upper edges; grate bars removably supported at their respective ends in said opposed recesses in the respective spaced angle frames, thereby forming an undulating grate surface adapted to support the material to be cremated while permitting free passage of combustion gases therethrough.

7. In combination with a unit as set forth in claim 6, an inclined baffle plate extending from the end of the grate over the burner nozzle to the adjacent end of the casing, said plate being disposed in alignment with and forming a continuation of the adjacent series of grate bars.

8. In combination with a unit as set forth in claim 6, an auxiliary series of parallel grate bars extending from the end of the grate remote from the burner and disposed normal to the adjacent series of grate bars and being disposed in alignment with said adjacent series of grate bars on the frames and forming a continuation of said adjacent series and extending to the adjacent end of the casing.

9. In a unit as set forth in claim 6, said burner comprising an oil-fired gun-type atomizing burner.

10. In a unit as set forth in claim 6, skid runners supporting said casing whereby the same is readily portable to different locations.

11. A portable crematory unit comprising a casing of substantially elliptical horizontal cross-section closed at its bottom and at its top; said top having a filling opening therein normally closed by a cover plate; a smokestack extending above the top; a liner within the casing extending around and spaced from the sides thereof; means for admitting air into the casing through the liner adjacent the lower end of the casing to support combustion; a normally closed clean-out door through the casing and liner; a burner having a nozzle entering the casing adjacent the lower end thereof; a hood over the exposed outer end of the burner; and a grate horizontally disposed within the casing above the burner, said grate comprising spaced angle frames of relatively flattened W-shape in longitudinal cross section removably secured to opposite sides of the liner and having a series of semi-circular recesses in their upper edges; grate bars removably supported at their respective ends in said opposed recesses in the respective spaced angle frames, thereby forming an undulating grate surface adapted to support the material to be cremated while permitting free passage of combustion gases therethrough.

12. In combination with a unit as set forth in claim 11, an inclined baffle plate extending from the end of the grate over the burner nozzle to the adjacent end of the casing, said plate being disposed in alignment with and forming a continuation of the adjacent series of grate bars.

13. In combination with a unit as set forth in claim 11, an auxiliary series of parallel grate bars extending from the end of the grate remote from the burner and disposed normal to the adjacent series of grate bars and being disposed in alignment with said adjacent series of grate bars on the frames, and forming a continuation of said adjacent series and extending to the adjacent end of the casing.

14. In a unit as set forth in claim 11, said burner comprising an oil-fired gun-type atomizing burner.

15. In a unit as set forth in claim 11, skid runners supporting said casing whereby the same is readily portable to different locations.

16. A grate for cermatories or the like comprising horizontally spaced angle frames of relatively flattened W-shape in longitudinal cross section having a series of opposed semi-circular recesses in their upper edges; grate bars removably supported at their respective ends in said opposed recesses; thereby forming an undulating grate surface adapted to support material to be cremated while permitting free passage of combustion gases therethrough; and perforated bolting plates depending from the apices of the angle frames for mounting the grate within a crematory.

17. In combination with a grate as set forth in claim 16, an inclined baffle plate extending from one end of the grate disposed in alignment with and forming a continuation of the adjacent series of grate bars.

18. In combination with a grate as set forth in claim 16, an auxiliary series of grate bars extending from one end of the grate disposed normal to the adjacent series of grate bars and being disposed in alignment with said adjacent series of grate bars on the frames, and forming a continuation of the said adjacent series.

References Cited by the Examiner

UNITED STATES PATENTS

| | | | |
|---|---|---|---|
| 652,110 | 6/00 | Hughes et al. | |
| 1,137,232 | 4/15 | Ricketts | 110—18 |
| 1,156,691 | 10/15 | Kahn | 110—18 |
| 1,539,926 | 6/25 | Wilson | 126—152 X |
| 2,044,085 | 6/36 | Leghetto | 110—18 |
| 2,606,546 | 8/52 | McMullen | 110—7 X |
| 2,739,547 | 3/56 | Triggs | 110—18 |
| 3,081,944 | 3/63 | Sherman | 110—8 X |

JAMES W. WESTHAVER, *Primary Examiner.*